United States Patent
Gadela et al.

(10) Patent No.: US 11,799,778 B1
(45) Date of Patent: *Oct. 24, 2023

(54) PROCESSING SEGMENT ROUTING PACKETS WITH TWO POLICY PROCESSING INSTRUCTIONS IN A SEGMENT ROUTING DOMAIN

(71) Applicant: Juniper Networks, Inc., Sunnyvale, CA (US)

(72) Inventors: Sri Karthik Goud Gadela, Campbell, CA (US); Swamy Sadashivaiah Renu Kananda, Cupertino, CA (US); Jamsheed R Wania, Palo Alto, CA (US); Alex Baban, San Jose, CA (US); Amit Kumar Shrivastava, Bangalore (IN); Mohan Tatineni, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,655

(22) Filed: Oct. 11, 2022

Related U.S. Application Data

(63) Continuation of application No. 17/112,545, filed on Dec. 4, 2020, now Pat. No. 11,502,954.

(51) Int. Cl.
| | |
|---|---|
| *H04L 12/26* | (2006.01) |
| *H04L 12/715* | (2013.01) |
| *H04L 12/721* | (2013.01) |
| *H04L 12/723* | (2013.01) |
| *H04L 29/06* | (2006.01) |
| *H04L 45/74* | (2022.01) |

(Continued)

(52) U.S. Cl.
CPC ............ *H04L 45/74* (2013.01); *H04L 45/741* (2013.01); *H04L 69/167* (2013.01); *H04L 69/22* (2013.01)

(58) Field of Classification Search
CPC ..... H04L 45/74; H04L 45/741; H04L 69/167; H04L 69/22
See application file for complete search history.

(56) References Cited

U.S. PATENT DOCUMENTS

| | | | |
|---|---|---|---|
| 9,544,208 B2 | 1/2017 | Scholz | |
| 9,641,435 B1 * | 5/2017 | Sivaramakrishnan | ...................... H04L 69/166 |

(Continued)

OTHER PUBLICATIONS

Co-pending U.S. Appl. No. 17/112,545, inventor Gadela; Sri Karthik Goud, filed Dec. 4, 2020.

*Primary Examiner* — Alpus Hsu
(74) *Attorney, Agent, or Firm* — Harrity & Harrity, LLP

(57) ABSTRACT

A network device may receive a packet and may determine whether a next header of the packet is an Internet protocol (IP) header, an Internet control message protocol (ICMP) header, or a segment routing header. The network device may determine, when the next header of the packet is the IP header, whether policy processing of the packet is set to ultimate segment decapsulation and may discard the packet when the policy processing of the packet is not set to ultimate segment decapsulation. The network device may decapsulate an outer header of the packet when the policy processing of the packet is set to ultimate segment decapsulation and may process the packet after decapsulating the outer header of the packet, to generate a processed packet. The network device may forward the processed packet toward a destination.

20 Claims, 10 Drawing Sheets

(51) Int. Cl.
   *H04L 69/22*      (2022.01)
   *H04L 69/167*     (2022.01)
   *H04L 45/741*     (2022.01)

(56) References Cited

U.S. PATENT DOCUMENTS

| | | |
|---|---|---|
| 10,027,594 B1   | 7/2018  | Seshadri et al. |
| 10,218,593 B2   | 2/2019  | Pignataro et al. |
| 10,333,853 B1   | 6/2019  | Seshadri et al. |
| 10,419,982 B1   | 9/2019  | Gundavelli et al. |
| 10,469,367 B2   | 11/2019 | Filsfils et al. |
| 10,616,063 B1   | 4/2020  | Dutta |
| 10,652,133 B1   | 5/2020  | Morris |
| 10,764,175 B1   | 9/2020  | Filsfils et al. |
| 10,812,374 B2   | 10/2020 | Heron et al. |
| 10,855,546 B2 * | 12/2020 | Shokarev ............... H04L 43/02 |
| 10,972,377 B2 * | 4/2021  | Nainar ................... H04L 43/026 |
| 11,005,756 B2 * | 5/2021  | Nainar ................... H04L 45/64 |
| 11,265,287 B2   | 3/2022  | Zhang et al. |
| 11,388,088 B2 * | 7/2022  | Filsfils ................. H04L 43/106 |

* cited by examiner

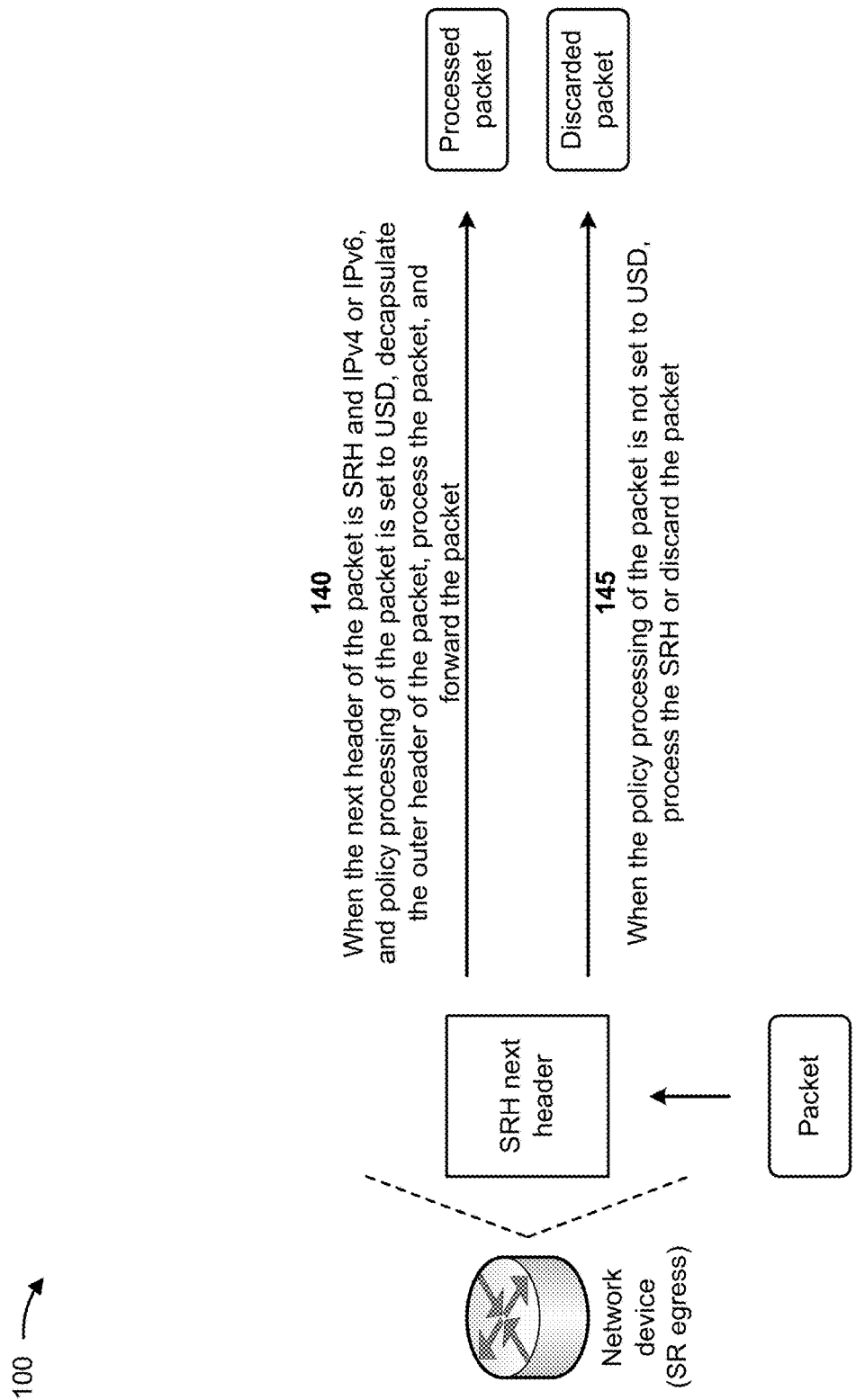

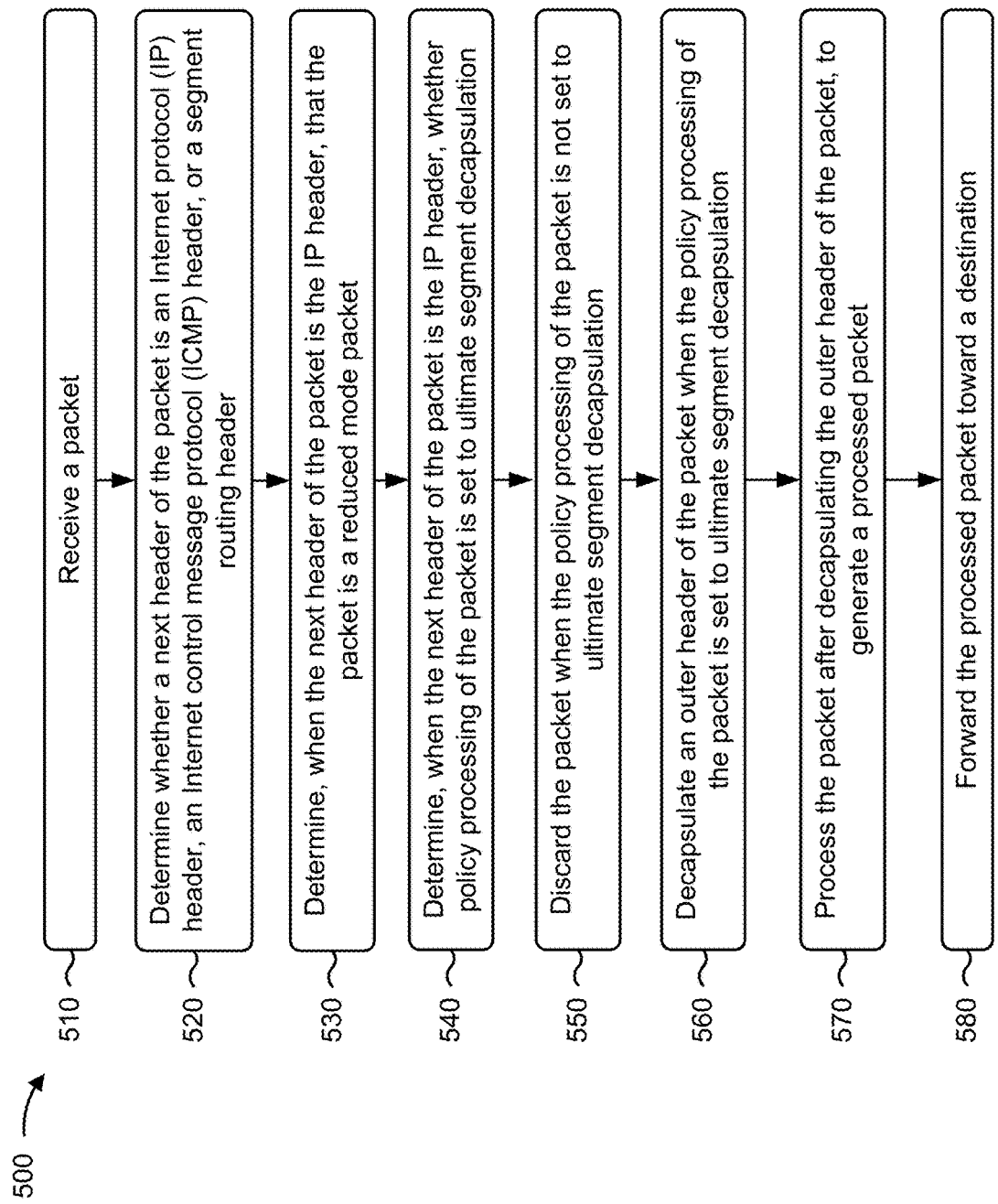

PROCESSING SEGMENT ROUTING PACKETS WITH TWO POLICY PROCESSING INSTRUCTIONS IN A SEGMENT ROUTING DOMAIN

RELATED APPLICATION

This application is a continuation of U.S. patent application Ser. No. 17/112,545, filed Dec. 4, 2020, which is incorporated herein by reference in its entirety.

BACKGROUND

Segment routing relates to an ingress network device in a segment routing domain that steers traffic (e.g., a packet) by dictating a path as a set of encoded instructions (e.g., a segment identifier (SID)) in the packet from the ingress network device to an egress network device of the segment routing domain.

SUMMARY

In some implementations, a method includes receiving a packet, and determining whether a next header of the packet is an Internet protocol (IP) header, an Internet control message protocol (ICMP) header, or a segment routing header. The method may include determining, when the next header of the packet is the IP header, that the packet is a reduced mode packet, and determining, when the next header of the packet is the IP header, whether policy processing of the packet is set to ultimate segment decapsulation. The method may include discarding the packet when the policy processing of the packet is not set to ultimate segment decapsulation and decapsulating an outer header of the packet when the policy processing of the packet is set to ultimate segment decapsulation. The method may include processing the packet after decapsulating the outer header of the packet, to generate a processed packet, and forwarding the processed packet toward a destination.

In some implementations, a network device includes one or more memories, and one or more processors to receive a packet, and determine whether a next header of the packet is an IP header, an ICMP header, or a segment routing header. The one or more processors may determine, when the next header of the packet is the IP header, whether policy processing of the packet is set to ultimate segment decapsulation, and may discard the packet when the policy processing of the packet is not set to ultimate segment decapsulation. The one or more processors may decapsulate an outer header of the packet when the policy processing of the packet is set to ultimate segment decapsulation and may process the packet after decapsulating the outer header of the packet, to generate a processed packet. The one or more processors may forward the processed packet toward a destination.

In some implementations, a non-transitory computer-readable medium may store a set of instructions that includes one or more instructions that, when executed by one or more processors of a network device, cause the network device to receive a packet that includes a set of encoded instructions that dictate a path for the packet, and determine whether a next header of the packet is an IP header, an ICMP header, or a segment routing header. The one or more instructions may cause the network device to determine, when the next header of the packet is the IP header, whether policy processing of the packet is set to ultimate segment decapsulation, and discard the packet when the policy processing of the packet is not set to ultimate segment decapsulation. The one or more instructions may cause the network device to decapsulate an outer header of the packet when the policy processing of the packet is set to ultimate segment decapsulation and process the packet after decapsulating the outer header of the packet, to generate a processed packet. The one or more instructions may cause the network device to forward the processed packet toward a destination.

BRIEF DESCRIPTION OF THE DRAWINGS

FIGS. 1A-1F are diagrams of an example implementation described herein.

FIG. 5 is a flow chart of an example process associated with processing segment routing packets with two policy processing instructions in a segment routing domain.

DETAILED DESCRIPTION

Figure 1A:
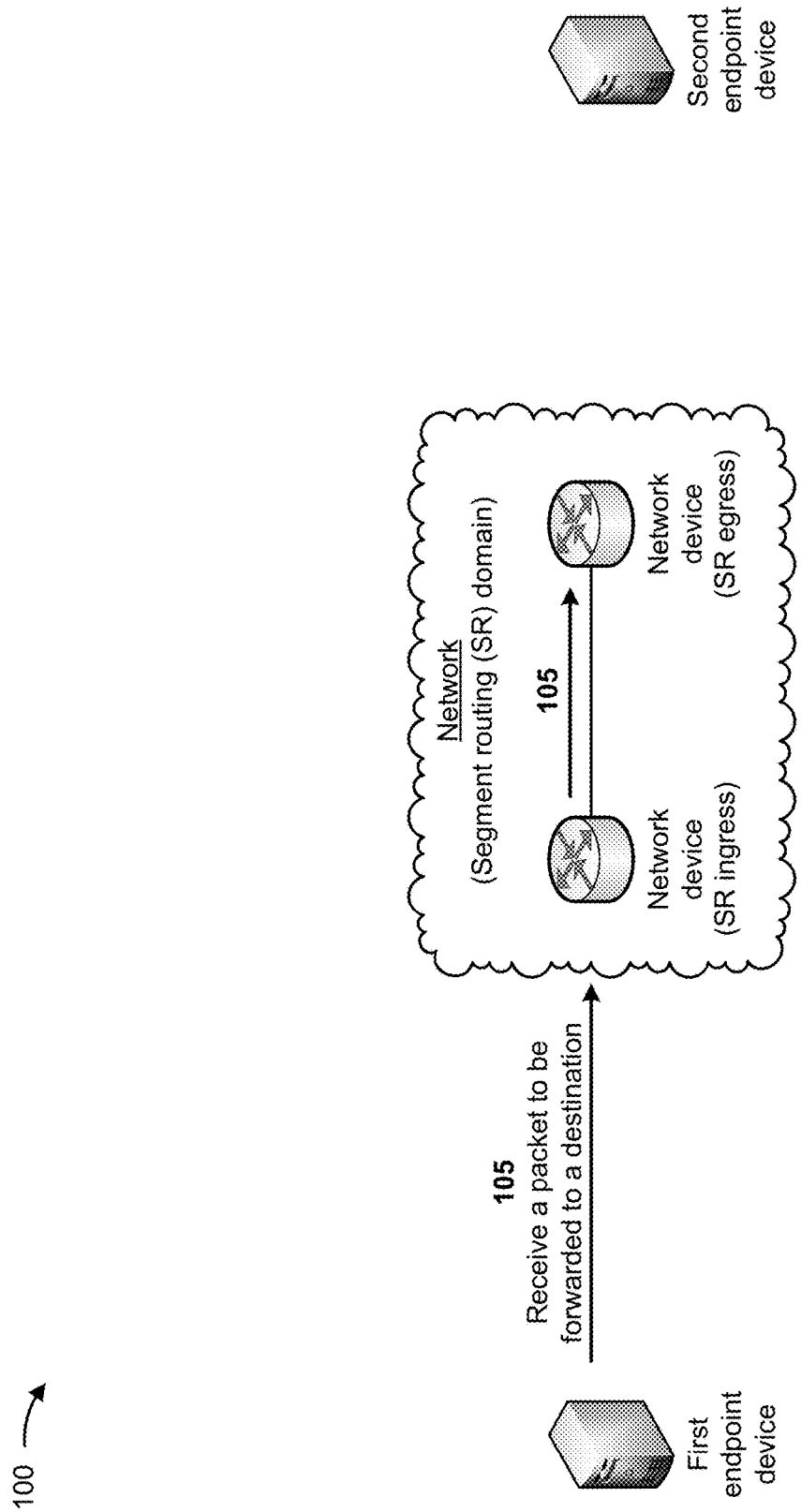

The following detailed description of example implementations refers to the accompanying drawings. The same reference numbers in different drawings may identify the same or similar elements.

A packet may undergo policy processing at an egress network device based on the segment routing instructions in the packet. The policy processing may include ultimate segment decapsulation (USD), ultimate segment pop (USP), and/or the like. The policy processing (e.g., USD or USP) may be included in properties of SIDs programmed in a forward information base (FIB). If USD is set in the packet, an SID route expects the egress network device to decapsulate an outer IP (e.g., IP version 4 (IPv4) or IP version 6 (IPv6)) header and a segment routing header (SRH) from the packet. If USP is set in the packet, an SID route expects the egress network device to decapsulate only the SRH from the packet.

In some situations, the egress network device may receive a packet in which both USD and USP are set. This may lead to issues for the egress network device since segment routing standards fail to specify a priority of processing between USD and USP for a packet in which both USD and USP are set. Thus, the priority of processing between USD and USP needs to be determined by a processing component of the egress network device to prevent unexpected forwarding issues, such as a forwarding loop for USP processing. Thus, current techniques for handling a packet in which both USD and USP are set waste computing resources (e.g., processing resources, memory resources, communication resources, and/or the like), networking resources, and/or the like associated with processing the packet, determining a route for the packet, experiencing a forwarding loop for the USP processing, and/or the like.

Some implementations described herein relate to a network device that processes segment routing packets with two policy processing instructions in a segment routing domain. For example, the network device may receive a packet and may determine whether a next header of the packet is an IP header, an ICMP header, or an SRH. In some implementations, the network device may determine, when the next header of the packet is the SRH (e.g., with ICMP), whether policy processing of the packet is set to USP and/or USD. The network device may provide, when the policy processing of the packet is set to USP and/or USD, the packet to a routing component of the network device for operations, administration, and maintenance (OAM) processing. The network device may perform, with the routing component, OAM processing of the packet to generate a processed packet and may forward the processed packet toward a destination.

In some implementations, the network device may determine, when the next header of the packet is the SRH with IP, whether policy processing of the packet is set to USP. The network device may pop the SRH of the packet when the policy processing of the packet is set to USP. The network device may process the packet after popping the SRH of the packet, to generate a processed packet, and may forward the processed packet toward the destination. In some implementations, the network device may determine, when the next header of the packet is the SRH with IP, whether policy processing of the packet is set to USD. The network device may decapsulate an outer header of the packet when the policy processing of the packet is set to USD. The network device may process the packet after decapsulating the outer header of the packet, to generate a processed packet, and may forward the processed packet toward the destination. The network device may discard the packet when the policy processing of the packet is not set to USD.

In this way, the network device may process segment routing packets with two policy processing instructions in a segment routing domain. For example, the network device may apply USP processing for a packet when there is more than one segment routing header in the packet (e.g., a topology independent loop-free alternate (TILFA) insert, a binding, an insert SID, and/or the like). Thus, the network device prevents temporary loops by discarding packets that cannot undergo USP processing (e.g., packets with a single segment routing header). This, in turn, conserves computing resources, networking resources, and/or the like that would otherwise have been wasted in processing the packet, determining a route for the packet, experiencing a forwarding loop for the USP processing, and/or the like.

FIGS. 1A-1F are diagrams of one or more example implementations 100 described herein. FIGS. 1A-1F are diagrams of an example implementation related to processing segment routing packets with two policy processing instructions in a segment routing domain. As shown in FIG. 1A, a network may include multiple network devices and may be associated with endpoint devices. The network may include one or more wired and/or wireless networks in a segment routing domain. Each network device may include a device capable of receiving, processing, storing, routing, and/or providing traffic (e.g., a packet, other information or metadata, and/or the like) in a manner described herein. For example, a network device may include a router, a switch, a gateway, a firewall, a hub, a bridge, a reverse proxy, a server, a load balancer, and/or the like. Each endpoint device may include a client device (e.g., a mobile phone, a laptop computer, a tablet computer, a desktop computer, and/or the like), a server device, and/or the like.

As shown in FIG. 1A, and by reference number 105, a network device (e.g., a segment routing egress network device) may receive a packet to be forwarded to a destination. For example, the first endpoint device may send a packet to the network that is destined for the second endpoint device. An additional network device (e.g., a segment routing ingress network device) of the network may receive the packet from the first endpoint device and may route the packet to the network device.

The packet may include a set of encoded instructions that dictate a path for the packet (e.g., a path from the additional network device to the network device and/or a path from the network device to the second endpoint device). In some implementations, the network device may identify and process (e.g., parse) a next header (e.g., a next header segment) of the packet. Accordingly, the network device may determine whether the next header of the packet is, for example, an IP header, an ICMP header, or an SRH.

Figure 1B:
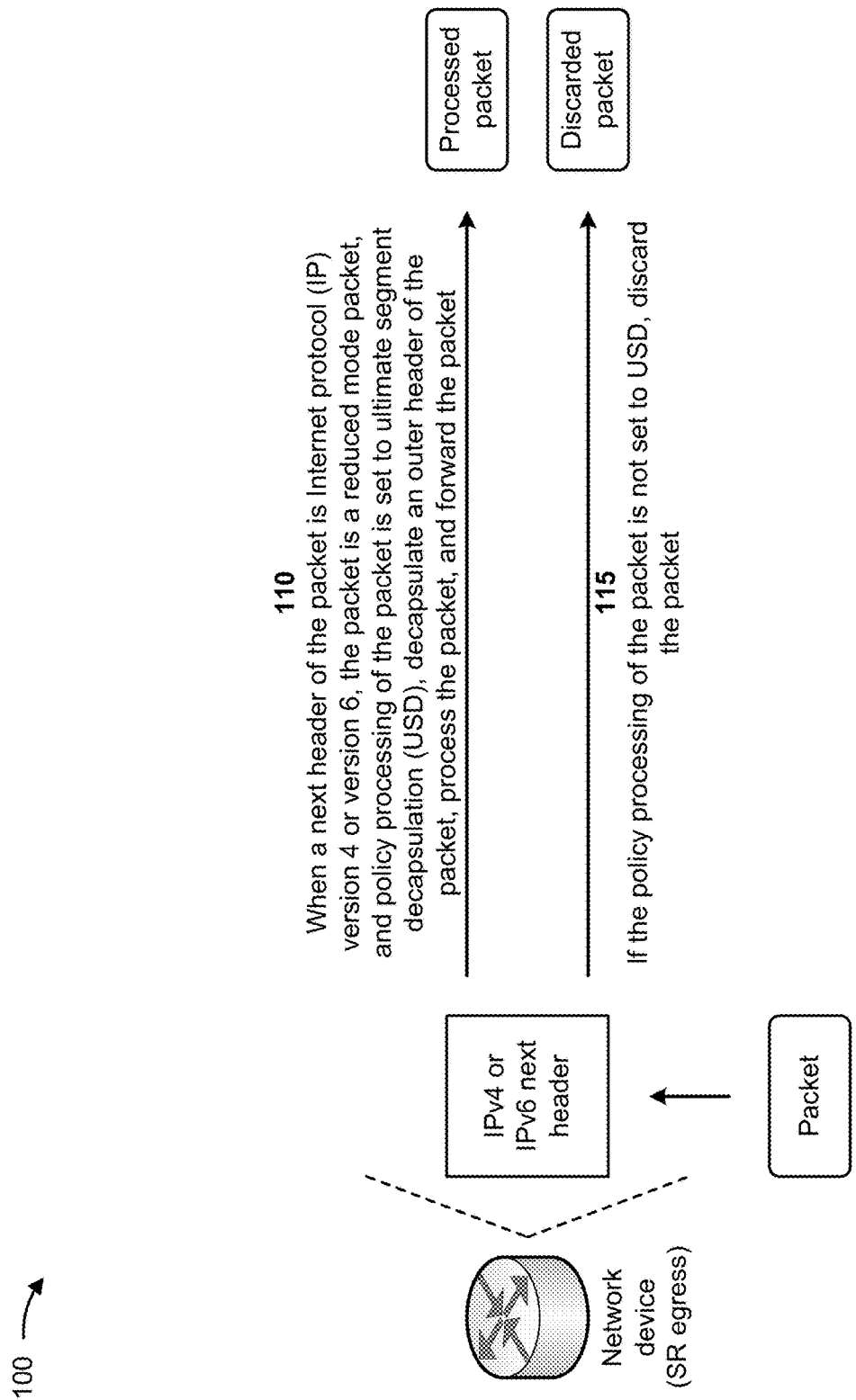

As shown in FIG. 1B, and by reference number 110, the network device may determine that the next header of the packet is an IP header (e.g., an IPv4 or IPv6 next header). In some implementations, the network device may determine that the packet does not include an SRH and may therefore determine that the packet is a reduced mode packet.

In some implementations, the network device may determine (e.g., based on determining that the next header of the packet is the IP header and/or that the packet is the reduced mode packet) whether policy processing of the packet is set to USD (e.g., whether a policy processing segment of the packet indicates USD). When the policy processing of the packet is set to USD (e.g., the policy processing segment of the packet indicates USD), the network device may decapsulate an outer header of the packet. The network device may process the packet (e.g., after decapsulating the outer header of the packet) to generate a processed packet and may forward the processed packet toward the destination (e.g., the second endpoint device). As further shown in FIG. 1B, and reference number 115, when the policy processing of the packet is not set to USD (e.g., the policy processing segment of the packet does not indicate USD), the network device may discard the packet.

Figure 1C:
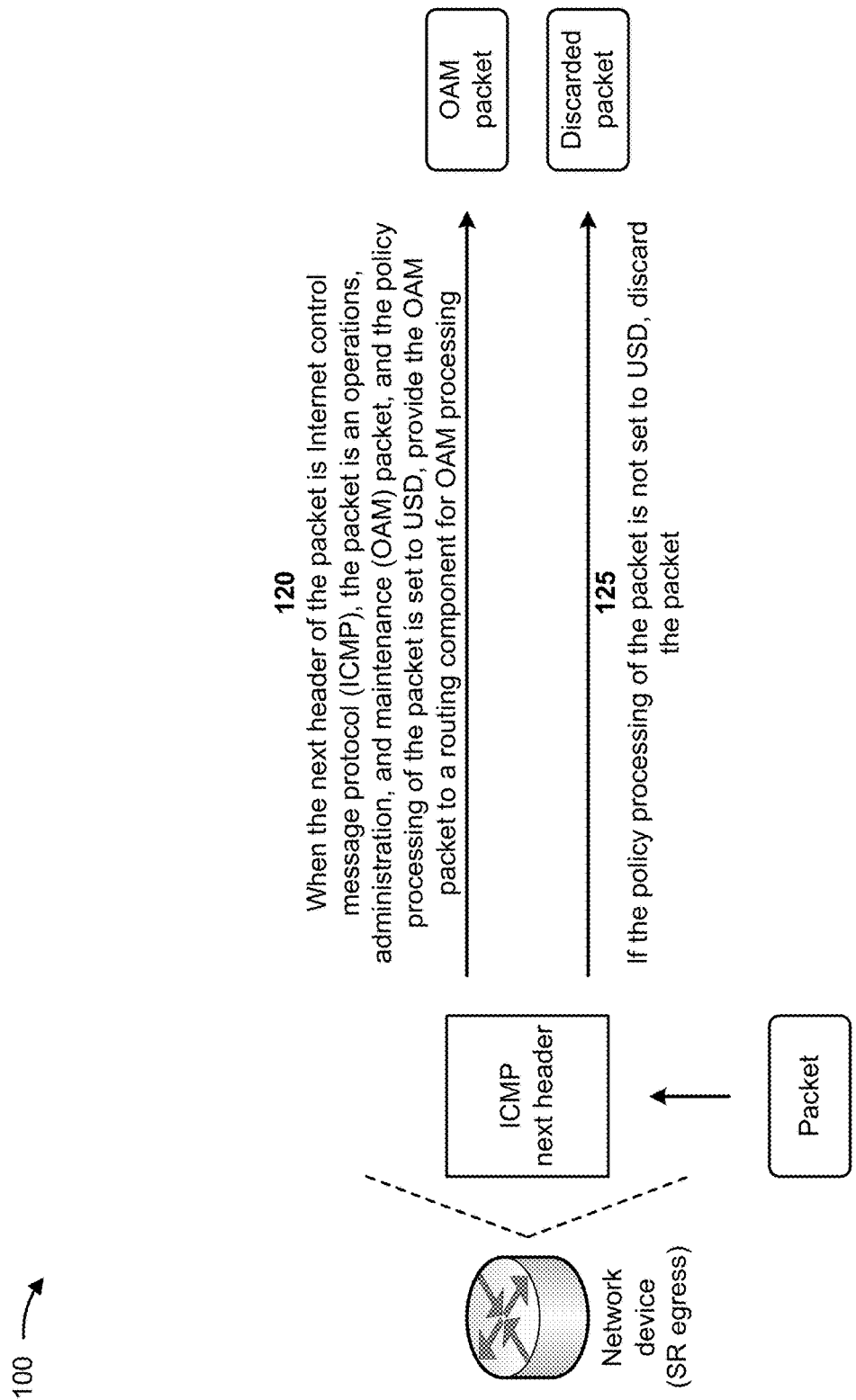

Turning to FIG. 1C, and reference number 120, the network device may determine that the next header of the packet is an ICMP header (e.g., an ICMPv4 or an ICMPv6 next header). Accordingly, the network device may determine that the packet is an OAM packet.

In some implementations, the network device may determine (e.g., based on determining that the next header of the packet is the ICMP header and/or determining that the packet is the OAM packet) whether policy processing of the packet is set to USD. When the policy processing of the packet is set to USD (e.g., the policy processing segment of the packet indicates USD), the network device may provide the packet to a routing component of the network device for OAM processing (e.g., to facilitate operation, administration, and/or maintenance of the network device and/or the network). The network device (e.g., using the routing component of the network device) may perform OAM processing of the packet to generate a processed packet and may forward the processed packet toward the destination (e.g., the second endpoint device). As further shown in FIG. 1C, and reference number 125, when the policy processing of the packet is not set to USD, the network device may discard the packet.

Figure 1D:
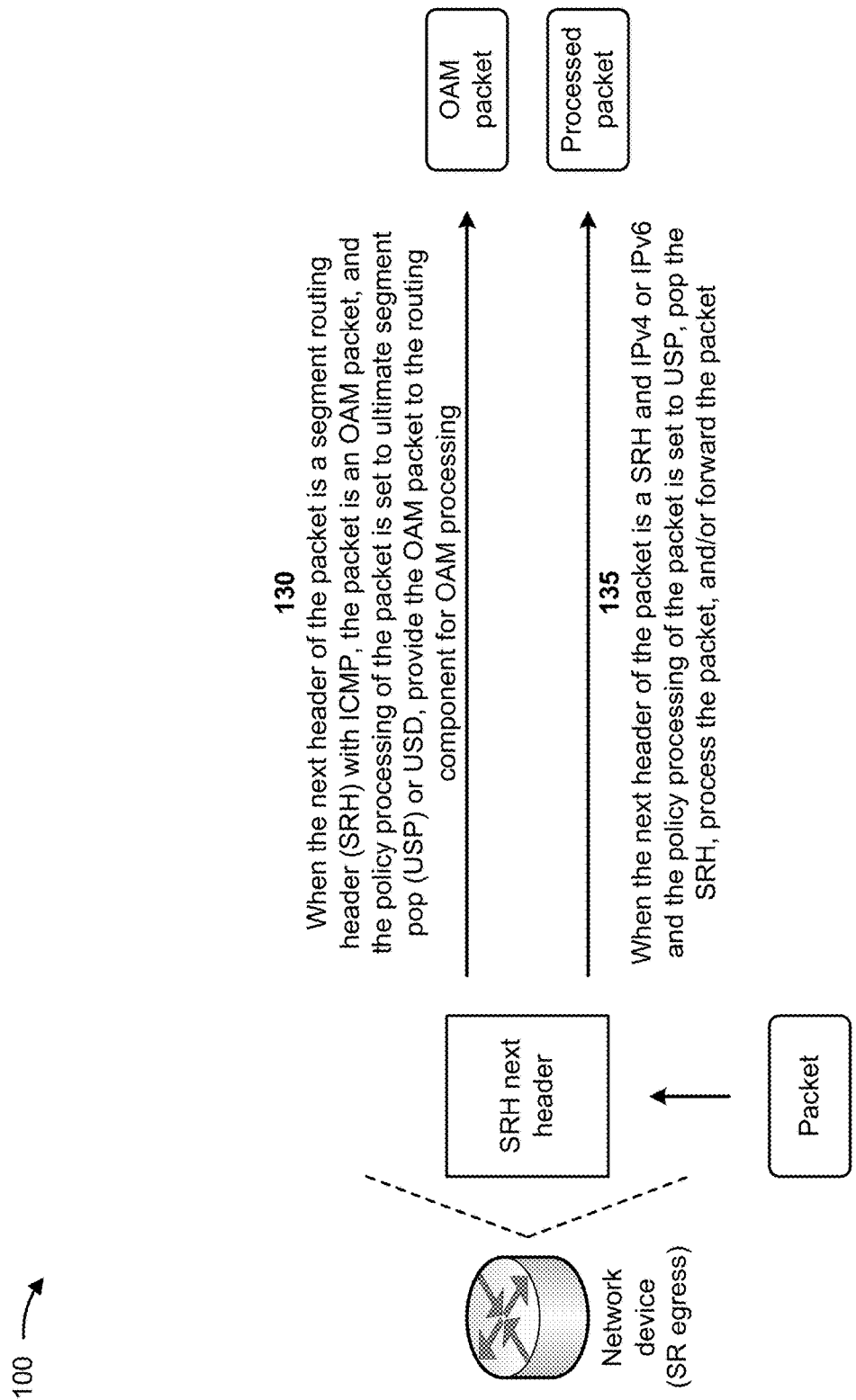

Turning to FIG. 1D, and reference number 130, the network device may determine that the next header of the packet is an SRH with ICMP (e.g., ICMPv4 or ICMPv6). Accordingly, the network device may determine that the packet is an OAM packet.

In some implementations, the network device may determine (e.g., based on determining that the next header of the packet is the SRH with ICMP and/or determining that the packet is the OAM packet) whether policy processing of the packet is set to USP and/or USD. When the policy processing of the packet is set to USP and/or USD (e.g., the policy processing segment of the packet indicates USP and/or USD), the network device may provide the packet to a routing component of the network device for OAM processing (e.g., to facilitate operation, administration, and/or maintenance of the network device and/or the network). The network device (e.g., using the routing component of the network device) may perform OAM processing of the packet to generate a processed packet and may forward the processed packet toward the destination (e.g., the second endpoint device).

As further shown in FIG. 1D, and by reference number 135, the network device may determine that the next header of the packet is an SRH with IP (e.g., IPv4 or IPv6). Accordingly, the network device may determine that the packet is an OAM packet.

In some implementations, the network device may determine (e.g., based on determining that the next header of the packet is the SRH with IP and/or that the packet is the OAM packet) whether policy processing of the packet is set to USP. When the policy processing of the packet is set to USP (e.g., the policy processing segment of the packet indicates USP), the network device may pop the SRH of the packet. The network device may process the packet after popping the SRH of the packet to generate a processed packet and may forward the processed packet toward a destination (e.g., the second endpoint device).

As shown in FIG. 1E, and by reference number 140, the network device may determine that the next header of the packet is an SRH with IP (e.g., IPv4 or IPv6). The network device may determine (e.g., based on determining that the next header of the packet is the SRH with IP) whether policy processing of the packet is set to USD. When the policy processing of the packet is set to USD (e.g., the policy processing segment of the packet indicates USD), the network device may decapsulate an outer header of the packet. The network device may process the packet (e.g., after decapsulating the outer header of the packet) to generate a processed packet and may forward the processed packet toward a destination. As further shown in FIG. 1E, and reference number 145, when the policy processing of the packet is not set to USD (e.g., the policy processing segment of the packet does not indicate USD), the network device may process the SRH and/or may discard the packet.

In some implementations, the network device may determine, when the next header of the packet is the SRH, whether the packet includes more than one SRH. The network device may discard the packet when the policy processing of the packet is set to USP (e.g., the policy processing segment of the packet indicates USP), and the packet fails to include more than one SRH. Alternatively, the network device may perform USP processing on the packet when the policy processing of the packet is set to USP (e.g., the policy processing segment of the packet indicates USP), and the packet includes more than one SRH. The network device may forward the packet toward the destination (e.g., the second endpoint device) after performing the USP processing on the packet.

Figure 1F:
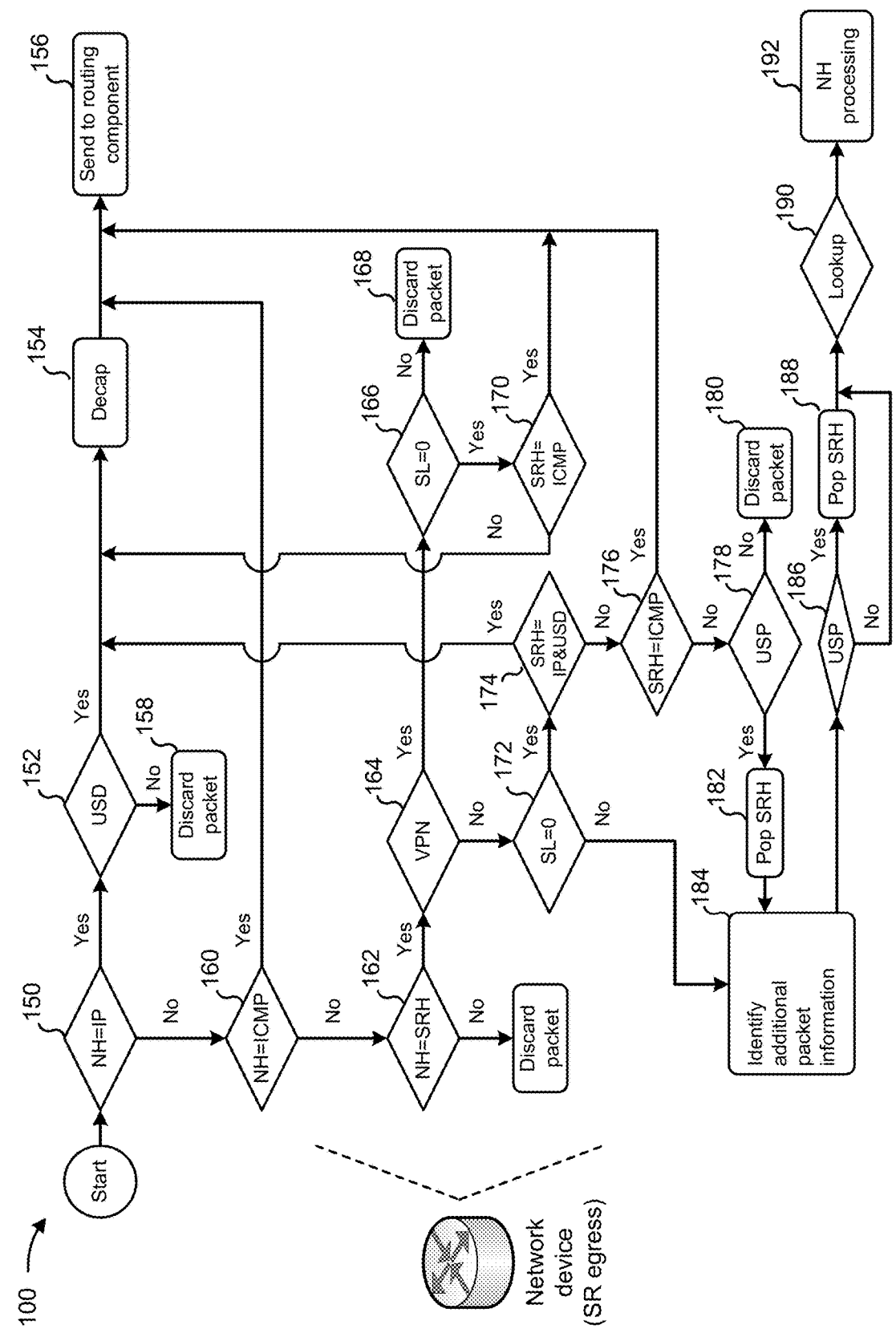

FIG. 1F is a flowchart of an example process associated with processing segment routing packets with two policy processing instructions in a segment routing domain. As shown by reference number 150, the network device may determine that the next header of a packet is an IP header. Accordingly, the network device may process the packet in a similar manner as that described herein in relation to FIG. 1B and reference numbers 110-115. For example, as shown by reference number 152, the network device may determine whether policy processing of the packet is set to USD. When the network device determines that the packet is set to USD, the network device may decapsulate an outer header of the packet to generate a processed packet and may send the processed packet to a routing component of the network device (e.g., that routes the processed packet to a destination), as shown by reference numbers 154-156. Alternatively, as shown by reference number 158, when the network device determines that the packet is not set to USD, the network device may discard the packet.

As further shown in FIG. 1F, and by reference number 160, the network device may determine that the next header of the packet is an ICMP header. Accordingly, the network device may process the packet in a similar manner as that described herein in relation to FIG. 1C and reference numbers 120-125. For example, as shown by reference number 156, the network device may send the packet to the routing component of the network device (e.g., to allow the routing component to perform OAM processing of the packet to generate and send a processed packet to a destination).

As further shown in FIG. 1F, and by reference number 162, the network device may determine that the next header of the packet is an SRH. Accordingly, the network device may process the packet in a similar manner as that described herein in relation to FIGS. 1D-1E and reference numbers 130-145. For example, as shown by reference number 164, the network device may determine whether the packet is associated with a virtual private network (VPN) session. When the network device determines that the packet is associated with the VPN session, the network device may determine, as shown by reference number 166, whether a number of segments left in the packet (SL) is equal to zero. As shown by reference number 168, when the network device determines that the SL is not equal to zero, the network device may discard the packet. As shown by reference number 170, when the network device determines that the SL is equal to zero, the network device may determine whether the SRH includes ICMP. When the network device determines that the SRH includes ICMP, the network device may send the packet to the routing component of the network device (e.g., to allow the routing component to perform OAM processing of the packet to generate and send a processed packet to a destination), as shown by reference number 156. Alternatively, when the network device determines that the SRH does not include ICMP, the network device may decapsulate an outer header of the packet to generate a processed packet and may send the processed packet to a routing component of the network device (e.g., that routes the processed packet to a destination), as shown by reference numbers 154-156.

When the network device determines that the packet is not associated with the VPN session, the network device may determine, as shown by reference number 172, whether the SL is equal to zero. As shown by reference number 174, when the network device determines that the SL is equal to zero, the network device may determine whether the SRH includes IP and the policy processing of the packet is set to USD. When the network device determines that the SRH includes IP and that the policy processing of the packet is set to USD, the network device may decapsulate an outer header of the packet to generate a processed packet and may send the processed packet to a routing component of the network device (e.g., that routes the processed packet to a destination), as shown by reference numbers 154-156. When the network device determines that the SRH does not include IP and/or that the policy processing of the packet is not set to USD, the network device may determine whether the SRH includes ICMP, as shown by reference number 176. When the network device determines that the SRH includes ICMP, the network device may send the packet to the routing component of the network device (e.g., to allow the routing component to perform OAM processing of the packet to generate and send a processed packet to a destination), as shown by reference number 156.

When the network device determines that the SRH does not include ICMP, the network device may determine whether the policy processing of the packet is set to USP, as shown by reference number 178. As shown by reference number 180, when the network device determines that the policy processing of the packet is not set to USP, the network device may discard the packet. Alternatively, as shown by reference number 182, when the network device determines that the policy processing of the packet is set to USP, the network device may pop the SRH of the packet.

As further shown in FIG. 1F, and by reference number 184, the network device may identify (e.g., after determining that the SL is not equal to zero, as described in relation to reference number 172, or after popping the SRH of the packet, as described in relation to reference number 182) additional packet information. For example, the network device may determine, based on performing the pop of the SRH, an additional SRH of the packet. Accordingly, as shown by reference number 186, the network device may determine whether the policy processing of the packet is set to USP. As shown by reference number 188, when the network device determines that the policy processing of the packet is set to USP, the network device may pop the additional SRH of the packet.

As further shown in FIG. 1F, and by reference number 190, the network device may perform a lookup (e.g., in a forward information base (FIB)) after popping the additional SRH (e.g., as described herein in relation to reference number 188) or after the network device determines that the policy processing of the packet is not set to USP (e.g., as described herein in relation to reference number 186). Accordingly, as shown by reference number 192, the network device may process the next header of the packet.

In this way, the network device may process segment routing packets with two policy processing instructions in a segment routing domain. For example, the network device may apply USP processing for a packet when there is more than one segment routing header in the packet (e.g., a TILFA insert, a binding, an insert SID, and/or the like). Thus, the network device prevents temporary loops by discarding packets that cannot undergo USP processing (e.g., packets with a single segment routing header). This, in turn, conserves computing resources, networking resources, and/or the like that would otherwise have been wasted in processing the packet, determining a route for the packet, experiencing a forwarding loop for the USP processing, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
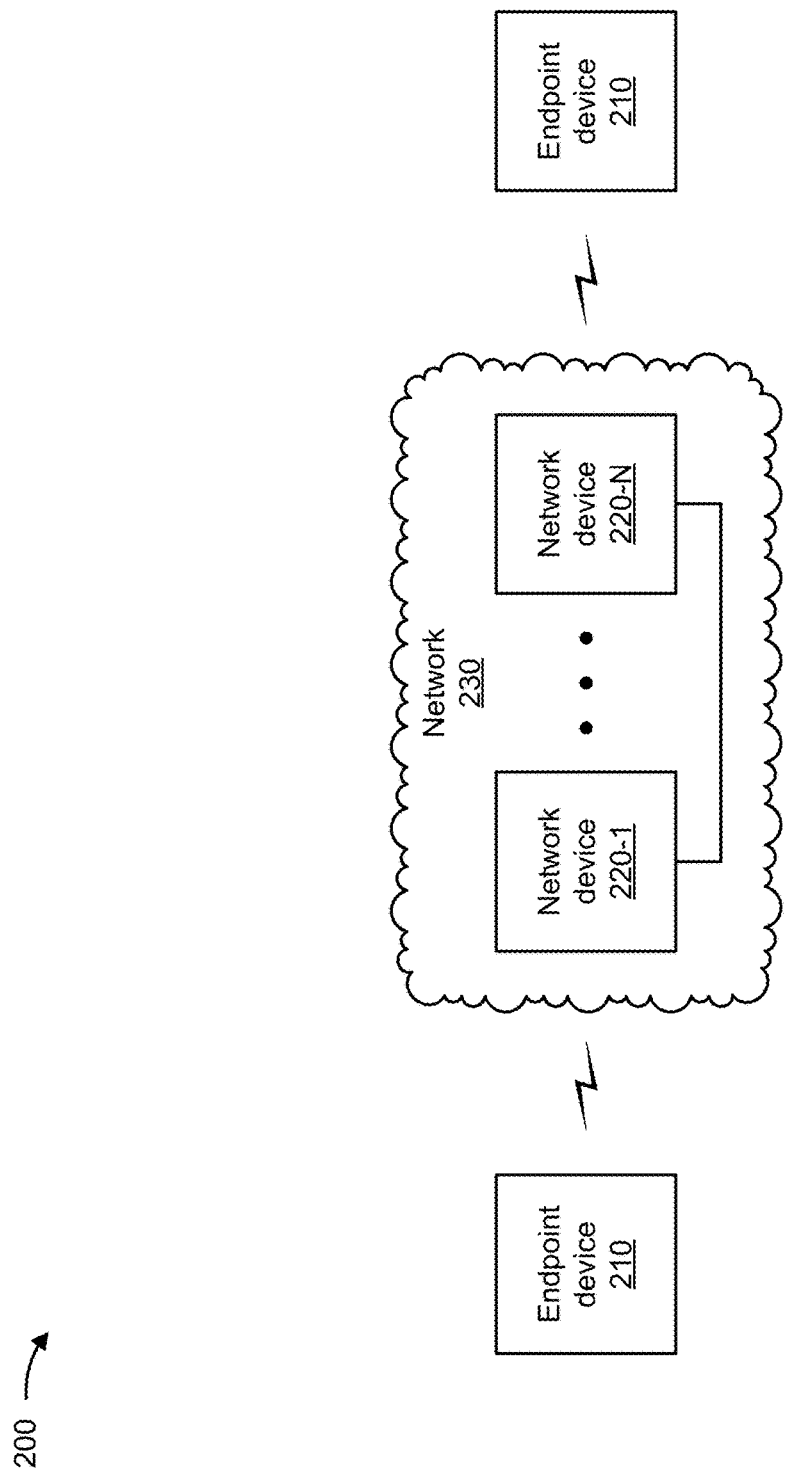
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include endpoint devices 210, a group of network devices 220 (shown as network device 220-1 through network device 220-N), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a client device (e.g., a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, and/or the like), a server device (e.g., a proxy server, a cloud server, a data center server, and/or the like), and/or a similar type of device. In some implementations, endpoint device 210 may receive network traffic (e.g., segment routing packets) from and/or may provide network traffic (e.g., segment routing packets) to other endpoint devices 210, via network 230 (e.g., by routing packets using network devices 220 as intermediaries).

Network device 220 includes one or more devices capable of receiving, processing, storing, routing, and/or providing traffic (e.g., a packet, other information or metadata, and/or the like) in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230. In some implementations, network device may process segment routing packets as described herein.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
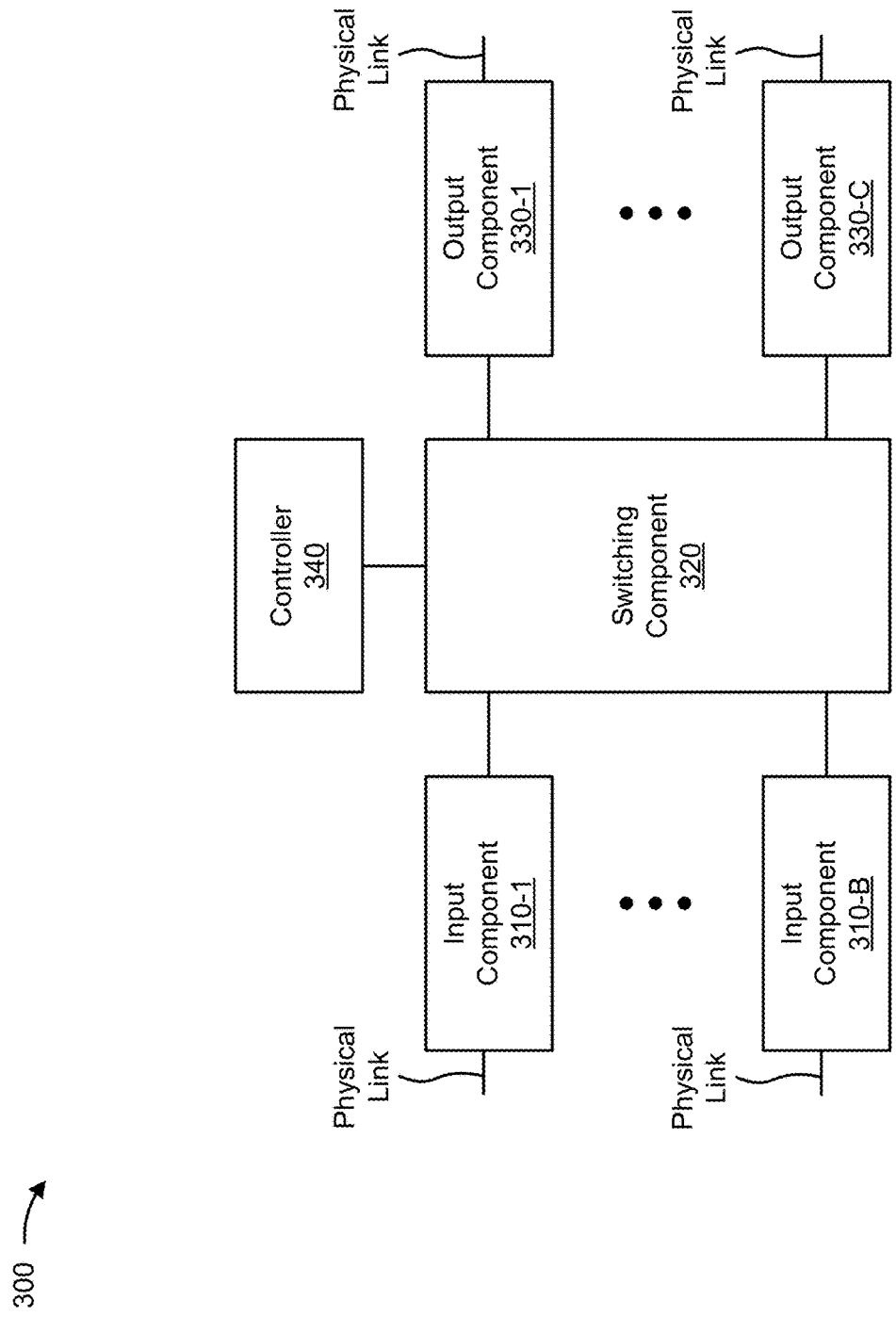
FIGS. 3 and 4 are diagrams of example components of one or more devices of FIG. 2.

FIG. 3 is a diagram of example components of a device 300. Device 300 may correspond to network device 220. In some implementations, network device 220 may include one or more devices 300 and/or one or more components of device 300. As shown in FIG. 3, device 300 may include one or more input components 310-1 through 310-B (B≥1) (hereinafter referred to collectively as input components 310, and individually as input component 310), a switching component 320, one or more output components 330-1 through 330-C (C≥1) (hereinafter referred to collectively as output components 330, and individually as output component 330), and a controller 340.

Input component 310 may be one or more points of attachment for physical links and may be one or more points of entry for incoming traffic, such as packets. Input component 310 may process incoming traffic, such as by performing data link layer encapsulation or decapsulation. In some implementations, input component 310 may transmit and/or receive packets. In some implementations, input component 310 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 310.

Switching component 320 may interconnect input components 310 with output components 330. In some implementations, switching component 320 may be implemented via one or more crossbars, via busses, and/or with shared memories. The shared memories may act as temporary buffers to store packets from input components 310 before the packets are eventually scheduled for delivery to output components 330. In some implementations, switching component 320 may enable input components 310, output components 330, and/or controller 340 to communicate with one another.

Output component 330 may store packets and may schedule packets for transmission on output physical links. Output component 330 may support data link layer encapsulation or decapsulation, and/or a variety of higher-level protocols. In some implementations, output component 330 may transmit packets and/or receive packets. In some implementations, output component 330 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 330. In some implementations, input component 310 and output component 330 may be implemented by the same set of components (e.g., and input/output component may be a combination of input component 310 and output component 330).

Controller 340 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 340 may include one or more processors that can be programmed to perform a function.

In some implementations, controller 340 may include a RAM, a ROM, and/or another type of dynamic or static storage device (e.g., a flash memory, a magnetic memory, an optical memory, etc.) that stores information and/or instructions for use by controller 340.

In some implementations, controller 340 may communicate with other devices, networks, and/or systems connected to device 300 to exchange information regarding network topology. Controller 340 may create routing tables based on the network topology information, may create forwarding tables based on the routing tables, and may forward the forwarding tables to input components 310 and/or output components 330. Input components 310 and/or output components 330 may use the forwarding tables to perform route lookups for incoming and/or outgoing packets.

Controller 340 may perform one or more processes described herein. Controller 340 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 340 from another computer-readable medium or from another device via a communication interface. When executed, software instructions stored in a memory and/or storage component associated with controller 340 may cause controller 340 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
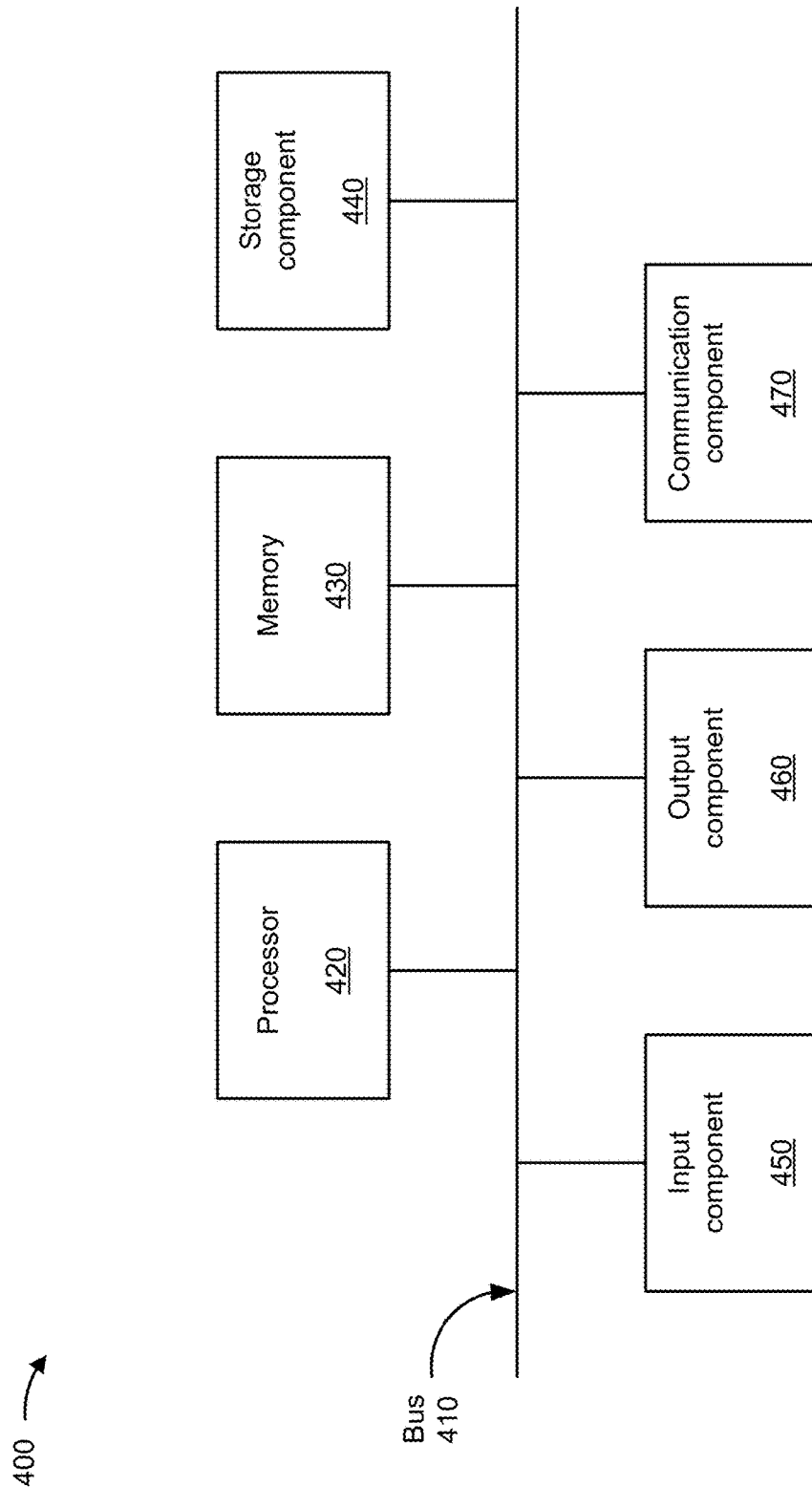

FIG. 4 is a diagram of example components of a device 400, which may correspond to endpoint device 210 and/or network device 220. In some implementations, endpoint device 210 and/or network device 220 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with processing segment routing packets with two policy processing instructions in a segment routing domain. In some implementations, one or more process blocks of FIG. 5 may be performed by a device (e.g., network device 220). In some implementations, one or more process blocks of FIG. 5 may be performed by another device or a group of devices separate from or including the device, such as an endpoint device (e.g., endpoint device 210). Additionally, or alternatively, one or more process blocks of FIG. 5 may be performed by one or more components of a device 300, such as input component 310, switching component 320, output component 330, controller 340, and/or one or more components of a device 400, such as processor 420, memory 430, storage component 440, input component 450, output component 460, communication component 470, and/or the like.

As shown in FIG. 5, process 500 may include receiving a packet (block 510). For example, the network device may receive a packet, as described above.

As further shown in FIG. 5, process 500 may include determining whether a next header of the packet is an IP header, an ICMP header, or a segment routing header (block 520). For example, the network device may determine whether a next header of the packet is an IP header, an ICMP header, or a segment routing header, as described above.

As further shown in FIG. 5, process 500 may include determining, when the next header of the packet is the IP header, that the packet is a reduced mode packet (block 530). For example, the network device may determine, when the next header of the packet is the IP header, that the packet is a reduced mode packet, as described above.

As further shown in FIG. 5, process 500 may include determining, when the next header of the packet is the IP header, whether policy processing of the packet is set to ultimate segment decapsulation (block 540). For example, the network device may determine, when the next header of the packet is the IP header, whether policy processing of the packet is set to ultimate segment decapsulation, as described above.

As further shown in FIG. 5, process 500 may include discarding the packet when the policy processing of the packet is not set to ultimate segment decapsulation (block 550). For example, the network device may discard the packet when the policy processing of the packet is not set to ultimate segment decapsulation, as described above.

As further shown in FIG. 5, process 500 may include decapsulating an outer header of the packet when the policy processing of the packet is set to ultimate segment decapsulation (block 560). For example, the network device may decapsulate an outer header of the packet when the policy processing of the packet is set to ultimate segment decapsulation, as described above.

As further shown in FIG. 5, process 500 may include processing the packet after decapsulating the outer header of the packet, to generate a processed packet (block 570). For example, the network device may process the packet after decapsulating the outer header of the packet, to generate a processed packet, as described above.

As further shown in FIG. 5, process 500 may include forwarding the processed packet toward a destination (block 580). For example, the network device may forward the processed packet toward a destination, as described above.

Process 500 may include additional implementations, such as any single implementation or any combination of implementations described below and/or in connection with one or more other processes described elsewhere herein.

In a first implementation, process 500 includes determining, when the next header of the packet is the ICMP header, that the packet is an OAM packet; determining, when the next header of the packet is the ICMP header, whether policy processing of the packet is set to ultimate segment decapsulation; discarding the packet when the policy processing of the packet is not set to ultimate segment decapsulation; providing, when the policy processing of the packet is set to ultimate segment decapsulation, the packet to a routing component of the network device for OAM processing; performing, by the routing component of the network device, OAM processing of the packet to generate a processed packet; and forwarding the processed packet toward the destination.

In a second implementation, alone or in combination with the first implementation, process 500 includes determining, when the next header of the packet is the segment routing header with ICMP, that the packet is an operations, administration, and maintenance (OAM) packet; determining, when the next header of the packet is the segment routing header with ICMP header, whether policy processing of the packet is set to ultimate segment pop or ultimate segment decapsulation; providing, when the policy processing of the packet is set to ultimate segment pop or ultimate segment decapsulation, the packet to a routing component of the network device for OAM processing; performing, by the routing component of the network device, OAM processing of the packet to generate a processed packet; and forwarding the processed packet toward the destination.

In a third implementation, alone or in combination with one or more of the first and second implementations, process 500 includes determining, when the next header of the packet is the segment routing header with IP, that the packet is an OAM packet; determining, when the next header of the packet is the segment routing header with IP, whether policy processing of the packet is set to ultimate segment pop; popping the segment routing header of the packet when the policy processing of the packet is set to ultimate segment pop; processing the packet after popping the segment routing header of the packet, to generate a processed packet; and forwarding the processed packet toward the destination.

In a fourth implementation, alone or in combination with one or more of the first through third implementations, process 500 includes determining, when the next header of the packet is the segment routing header with IP, whether policy processing of the packet is set to ultimate segment decapsulation; decapsulating an outer header of the packet when the policy processing of the packet is set to ultimate segment decapsulation; processing the packet after decapsulating the outer header of the packet, to generate a processed packet; and forwarding the processed packet toward the destination.

In a fifth implementation, alone or in combination with one or more of the first through fourth implementations, process 500 includes one of processing the segment routing header of the packet when the policy processing of the packet is not set to ultimate segment decapsulation, or discarding the packet when the policy processing of the packet is not set to ultimate segment decapsulation.

In a sixth implementation, alone or in combination with one or more of the first through fifth implementations, process 500 includes performing, when the next header of the packet is the segment routing header, ultimate segment pop processing on the packet when the packet includes more than one segment routing header.

In a seventh implementation, alone or in combination with one or more of the first through sixth implementations, the network device includes an egress network device in a segment routing domain.

In an eighth implementation, alone or in combination with one or more of the first through seventh implementations, process 500 includes determining, when the next header of the packet is the segment routing header, whether the packet includes more than one segment routing header; discarding the packet when the policy processing of the packet is set to ultimate segment pop and the packet fails to include more than one segment routing header; and performing ultimate segment pop processing on the packet when the policy processing of the packet is set to ultimate segment pop and the packet includes more than one segment routing header.

In a ninth implementation, alone or in combination with one or more of the first through eighth implementations, process 500 includes forwarding the packet toward the destination after performing the ultimate segment pop processing on the packet.

In a tenth implementation, alone or in combination with one or more of the first through ninth implementations, process 500 includes determining that a format of the packet includes the IP header followed by a first segment routing header and a second segment routing header, and performing ultimate segment pop processing on the packet based on the format of the packet.

In an eleventh implementation, alone or in combination with one or more of the first through tenth implementations, process 500 includes forwarding the packet toward the destination after performing the ultimate segment pop processing on the packet.

In a twelfth implementation, alone or in combination with one or more of the first through eleventh implementations, the packet includes a set of encoded instructions that dictate a path for the packet.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device, a packet;
   determining, by the network device, whether a next header of the packet is an Internet protocol (IP) header, an Internet control message protocol (ICMP) header, or a segment routing header;
   determining, by the network device and when the next header of the packet is the ICMP header, that the packet is an operations, administration, and maintenance (OAM) packet;
   determining, by the network device and when the next header of the packet is the ICMP header, whether policy processing of the packet is set to ultimate segment decapsulation;
   discarding, by the network device, the packet when the policy processing of the packet is not set to ultimate segment decapsulation;
   providing, by the network device and when the policy processing of the packet is set to ultimate segment decapsulation, the packet to a routing component of the network device for OAM processing;
   performing, by the routing component of the network device, the OAM processing to generate a processed packet; and
   forwarding, by the network device, the processed packet toward a destination.

2. The method of claim 1, further comprising:
   determining, when the next header of the packet is the segment routing header, that the packet is an operations, administration, and maintenance (OAM) packet;
   determining, when the next header of the packet is the segment routing header, whether policy processing of the packet is set to ultimate segment pop or ultimate segment decapsulation;
   providing, when the policy processing of the packet is set to ultimate segment pop or ultimate segment decapsulation, the packet to a routing component of the network device for OAM processing;
   performing, by the routing component of the network device, OAM processing of the packet to generate a processed packet; and
   forwarding the processed packet toward the destination.

3. The method of claim 1, further comprising:
   determining, when the next header of the packet is the segment routing header, that the packet is an operations, administration, and maintenance (OAM) packet;
   determining, when the next header of the packet is the segment routing header, whether policy processing of the packet is set to ultimate segment pop;
   popping the segment routing header of the packet when the policy processing of the packet is set to ultimate segment pop;
   processing the packet after popping the segment routing header of the packet, to generate a processed packet; and
   forwarding the processed packet toward the destination.

4. The method of claim 1, further comprising:
   determining, when the next header of the packet is the segment routing header, whether policy processing of the packet is set to ultimate segment decapsulation;
   decapsulating an outer header of the packet when the policy processing of the packet is set to ultimate segment decapsulation;
   processing the packet after decapsulating the outer header of the packet, to generate a processed packet; and
   forwarding the processed packet toward the destination.

5. The method of claim 4, further comprising one of:
   processing the segment routing header of the packet when the policy processing of the packet is not set to ultimate segment decapsulation; or
   discarding the packet when the policy processing of the packet is not set to ultimate segment decapsulation.

6. The method of claim 1, further comprising:
   performing, when the next header of the packet is the segment routing header, ultimate segment pop processing on the packet when the packet includes more than one segment routing header.

7. A network device, comprising:
   one or more memories; and
   one or more processors to:
   receive a packet;
   determine whether a next header of the packet is an Internet protocol (IP) header, an Internet control message protocol (ICMP) header, or a segment routing header;
   determine, when the next header of the packet is the ICMP header, whether policy processing of the packet is set to ultimate segment decapsulation;
   discard the packet when the policy processing of the packet is not set to ultimate segment decapsulation;
   provide, when the policy processing of the packet is set to ultimate segment decapsulation, the packet to a routing component of the network device for operations, administration, and maintenance (OAM) processing;
   perform the OAM processing to generate a processed packet; and
   forward the processed packet toward a destination.

8. The network device of claim 7, wherein the network device includes an egress network device in a segment routing domain.

9. The network device of claim 7, wherein the one or more processors are further to:
   determine, when the next header of the packet is the segment routing header, whether the packet includes more than one segment routing header;
   discard the packet when the policy processing of the packet is set to ultimate segment pop and the packet fails to include more than one segment routing header; and
   perform ultimate segment pop processing on the packet when the policy processing of the packet is set to ultimate segment pop and the packet includes more than one segment routing header.

10. The network device of claim 9, wherein the one or more processors are further to:
    forward the packet toward the destination after performing the ultimate segment pop processing on the packet.

11. The network device of claim 7, wherein the one or more processors are further to:

determine, when the next header of the packet is the IP header, that a format of the packet includes the IP header followed by a first segment routing header and a second segment routing header; and perform ultimate segment pop processing on the packet based on the format of the packet.

12. The network device of claim 11, wherein the one or more processors are further to:

forward the packet toward the destination after performing the ultimate segment pop processing on the packet.

13. The network device of claim 7, wherein the packet includes a set of encoded instructions that dictate a path for the packet.

14. The network device of claim 7, wherein the one or more processors are further to:

determine, when the next header of the packet is the IP header, whether policy processing of the packet is set to ultimate segment decapsulation;

discard the packet when the policy processing of the packet is not set to ultimate segment decapsulation;

decapsulate an outer header of the packet when the policy processing of the packet is set to ultimate segment decapsulation;

process the packet after decapsulating the outer header of the packet, to generate a processed packet; and forward the processed packet toward a destination.

15. A non-transitory computer-readable medium storing a set of instructions, the set of instructions comprising:

one or more instructions that, when executed by one or more processors of a network device, cause the network device to:

receive a packet that includes a set of encoded instructions that dictate a path for the packet;

determine whether a next header of the packet is an Internet protocol (IP) header, an Internet control message protocol (ICMP) header, or a segment routing header;

determine, when the next header of the packet is the ICMP header, whether policy processing of the packet is set to ultimate segment decapsulation;

discard the packet when the policy processing of the packet is not set to ultimate segment decapsulation;

provide, when the policy processing of the packet is set to ultimate segment decapsulation, the packet to a routing component of the network device for operations, administration, and maintenance (OAM) processing;

perform the OAM processing to generate a processed packet; and forward the processed packet toward a destination.

16. The non-transitory computer-readable medium of claim 15, wherein the one or more instructions further cause the network device to:

determine, when the next header of the packet is the segment routing header, that the packet is an operations, administration, and maintenance (OAM) packet;

determine, when the next header of the packet is the segment routing header, whether policy processing of the packet is set to ultimate segment pop or ultimate segment decapsulation;

provide, when the policy processing of the packet is set to ultimate segment pop or ultimate segment decapsulation, the packet to a routing component of the network device for OAM processing;

perform, with the routing component, OAM processing of the packet to generate a processed packet; and forward the processed packet toward the destination.

17. The non-transitory computer-readable medium of claim 15, wherein the one or more instructions further cause the network device to:

determine, when the next header of the packet is the segment routing header, whether policy processing of the packet is set to ultimate segment pop;

pop the segment routing header of the packet when the policy processing of the packet is set to ultimate segment pop;

process the packet after popping the segment routing header of the packet, to generate a processed packet; and forward the processed packet toward the destination.

18. The non-transitory computer-readable medium of claim 15, wherein the one or more instructions further cause the network device to:

determine, when the next header of the packet is the segment routing header, whether policy processing of the packet is set to ultimate segment decapsulation;

decapsulate an outer header of the packet when the policy processing of the packet is set to ultimate segment decapsulation;

process the packet after decapsulating the outer header of the packet, to generate a processed packet;

forward the processed packet toward the destination; and discard the packet when the policy processing of the packet is not set to ultimate segment decapsulation.

19. The non-transitory computer-readable medium of claim 15, wherein the one or more instructions further cause the network device to:

determine, when the next header of the packet is the segment routing header, whether the packet includes more than one segment routing header;

discard the packet when the policy processing of the packet is set to ultimate segment pop and the packet fails to include more than one segment routing header;

perform ultimate segment pop processing on the packet when the policy processing of the packet is set to ultimate segment pop and the packet includes more than one segment routing header; and forward the packet toward the destination after performing the ultimate segment pop processing on the packet.

20. The non-transitory computer-readable medium of claim 15, wherein the network device includes an egress network device in a segment routing domain.

* * * * *